United States Patent [19]

Rickard

[11] 4,076,515

[45] Feb. 28, 1978

[54] METHOD FOR TREATMENT OF DIGESTER SUPERNATANT AND OTHER STREAMS IN WASTEWATER TREATMENT FACILITIES

[76] Inventor: M. David Rickard, 3530 Silver Springs Road, Lafayette, Calif. 94549

[21] Appl. No.: 594,541

[22] Filed: Jul. 9, 1975

[51] Int. Cl.$^2$ .................. C02C 1/14; C02C 5/10; C02C 3/00; C05F 7/00

[52] U.S. Cl. ................................. 71/10; 71/12; 71/57; 210/9; 210/10; 210/16; 210/18; 55/70; 423/357

[58] Field of Search ..................... 71/8–10, 71/12, 54, 57; 210/10, 16, 26, 28, 45, 48, 9, 8, 18; 55/70; 423/357

[56] References Cited

U.S. PATENT DOCUMENTS

| 122,773 | 1/1872 | Manning | 71/12 |
|---|---|---|---|
| 546,716 | 9/1895 | Shepard | 71/12 |
| 584,908 | 6/1897 | Venuleth | 71/12 |
| 918,744 | 4/1909 | Fryklind | 71/12 |
| 1,122,474 | 12/1914 | Butterfield | 71/12 |
| 1,319,663 | 10/1919 | Davis | 55/70 |
| 1,650,129 | 11/1927 | Jacobus | 210/48 |
| 1,928,510 | 9/1963 | Sperr | 423/357 |
| 2,613,181 | 10/1952 | Green | 210/45 |
| 2,754,192 | 7/1956 | Bray | 71/54 |
| 3,345,288 | 10/1967 | Sontheimer | 210/10 |
| 3,882,019 | 5/1974 | Burke | 210/45 |
| 3,920,419 | 11/1975 | Schroeder | 55/70 |

FOREIGN PATENT DOCUMENTS

| 4,561 of | 1881 | United Kingdom | 71/12 |
|---|---|---|---|
| 18,199 of | 1908 | United Kingdom | 71/12 |
| 24,063 of | 1894 | United Kingdom | 71/12 |
| 410,487 | 5/1934 | United Kingdom | 71/12 |
| 11,798 of | 1889 | United Kingdom | 71/12 |

OTHER PUBLICATIONS

Kohl & Riesenfeld, Gas Purification, McGraw-Hill Book Co., Inc., N.Y., 1960, p. 336.

Primary Examiner—Wilbur L. Bascomb, Jr.
Assistant Examiner—Ernest G. Therkorn

[57] ABSTRACT

Digester supernatants and/or liquors from sludge dewatering are reacted with an excess of an alkaline reagent having a stronger cation than the ammonium ion and the reaction product is separated into a solution containing aqueous ammonia and solids. The aqueous ammonia derived from the separation stage is heated by free steam under a lowered pressure to free ammonia in gaseous form. The ammonia as a gas, or adsorbed in water, or adsorbed in an acid, or as an acid salt is then mixed with conventionally dried sludge to increase the nitrogen content of the sludge from approximately 1–2 percent to as high as 10 percent.

2 Claims, 3 Drawing Figures

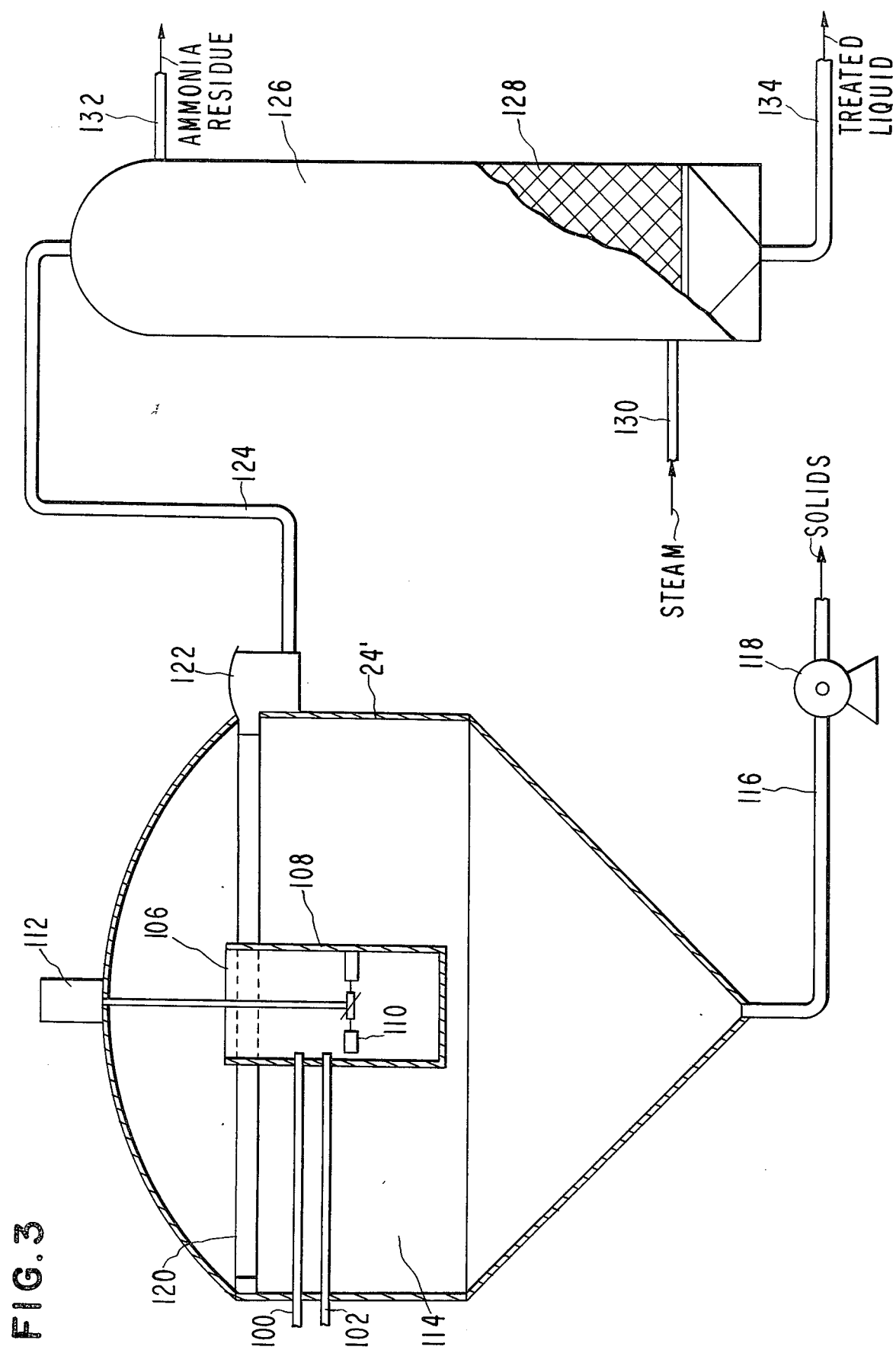

METHOD FOR TREATMENT OF DIGESTER SUPERNATANT AND OTHER STREAMS IN WASTEWATER TREATMENT FACILITIES

BACKGROUND OF THE INVENTION

The method of the invention relates to the treatment of domestic wastewaters and more particularly to increasing the nitrogen content of dried sludge derived from such wastewater treatment.

In the treatment of domestic wastewaters by conventional means, including primary sedimentation, biological oxidation, chemical precipitation, biological nitrification and denitrification, sludge streams containing relatively high concentrations of solids are produced. These sludges will commonly contain about 65 percent of the biochemical oxygen demand (BOD) and some 20 percent of the nitrogen which was in the untreated wastewater. Because of the high pollutional potential of such sludges, they must be extensively treated before safe, economical disposal of the solids is possible. Several methods have been suggested for the stabilization of such sludges. The process most commonly used, however, consists of first removing as much water from the sludge as possible by gravity or flotation thickening. The sludge is then biologically digested under anaerobic conditions. This digestion results in the conversion of much of the putrescible organic material to carbon dioxide and methane, the latter of which may be used as fuel. During this process, much of the nitrogen contained in the sludge is converted to water soluble ammonia.

After digestion, water in the form of digester supernatant is removed by allowing the sludge to stand quiescent for a period of time in the digester and decanting off the liquid. The concentrated sludge is then dewatered still further by vacuum filtration or other means. Both the digester supernatant and liquors from the dewatering process are commonly returned to the primary clarifiers as these streams contain significant quantities of organic material and, therefore, require treatment in the wastewater treatment processes.

The sludge solids which remain after filtration may be disposed of by incineration, land filling, composting or drying for sale as a soil conditioner. While the utilization of sludge as a soil conditioner or fertilizer has obvious advantages, many plants attempting to market dried or composted sludge have experienced difficulty. This relates to the conversion of organic nitrogen to water soluble ammonium salts within the anaerobic digester, which results in much of the nitrogen originally contained in the sludge being removed with the water in the digester supernatant and dewatering liquors. This ammonia nitrogen is returned with these streams to the head of the wastewater treatment plant to be removed as valueless nitrogen gas if denitrification is practiced, or to be discharged in the plant effluent.

In plants practicing nitrogen removal, return of these streams may substantially increase the cost of treatment, since they contain as much as 20 percent of the total nitrogen received by the plant. Further, the digester supernatant and sometimes the vacuum filtrates may be very odorous and further, may increase the organic (BOD) loading on the facilities.

I have discovered a method of treatment for digester supernatant and liquors from digested sludge dewatering by which the nitrogen contained in these streams is recovered as ammonia or a salt thereof, the streams are effectively deodorized and their BOD content substantially reduced. The nitrogen so recovered may be mixed with sludge dried in conventional drying equipment for the production of a high-grade organic fertilizer. Thus, benefits are gained both from the reduction of nitrogen, odor, and BOD of the digester supernatant and in the disposal of sludge solids by converting such materials to a saleable product.

While there are several known methods for recovering ammonia from ammoniacal liquors obtained during the treatment of fecal matter, such as U.S. Pat. Nos. 325,771 and 918,744, all of such methods involve one or more difficulties which greatly increase the cost of the removal process to the point where it is not economically competitive with my method. In the method disclosed in U.S. Pat. No. 325,771 (Schneider) the ammoniacal liquor is mixed with lime or other suitable alkaline substances and is heated by steam, acting either directly or through the walls of pipes, to distill the ammonia freed by the alkaline agent. This process is undertaken at either atmospheric pressure or an elevated pressure with the result that the ammonia gas, which is soluble in the water, is not efficiently freed in gaseous form. A similar problem is true in the U.S. Pat. No. 918,744 reference. The use of elevated pressure in such distilling operations has heretofore been considered to be an important feature. As, for example, see U.S. Pat. No. 1,838,587 which specifically teaches that a reduced pressure during such distilling operations results in a substantial lowering of the rate of the chemical reaction with a loss of efficiency.

In the practice of wastewater treatment, lime or other alkali is commonly used to increase the alkalinity of wastewater or to precipitate phosphorus. One installation has even been constructed wherein lime is added to the entire waste system, both to precipitate phosphorus and to free ammonia. In this system, the wastewater stream is passed through a tall tower after the lime addition. Air is then passed countercurrent to the waste to strip the liberated ammonia according to a well known process. This practice requires that the entire wastewater flow stream be treated rather than the relatively small streams from the digester and dewatering devices. The process is operated at the ambient temperature and pressure with a consequent loss of efficiency in carrying out the reaction. A further difficulty is that the process utilizes air stripping with a consequent release of the ammonia gas to the atmosphere rather than its recovery. It also creates a potential air pollution problem.

It has been the practice in refining of oil to produce gasoline and other products to strip "sour water," that is, condensate water which has been in contact with crude oil or partially refined petroleum, by steam stripping the sour water to remove hydrogen sulfide and ammonia. While sulfur is often recovered from the gas so liberated the ammonia which is also removed along with the sulfur is typically destroyed by burning.

Coke plants also commonly strip sour water with steam; however, the intent of this treatment is to remove both ammonia and hydrogen sulfide from the sour water and the released gas is burned rather than recovering the ammonia. Such conventional stripping as practiced in either oil refining or coal coke plants is not applicable to domestic wastewaters because of the high levels of dissolved carbonates in these streams. A high carbonate content results in scaling of the surfaces.

Still another prior art device has been described for the removal of ammonia from digester supernatant and other such streams. In this device, the liquors are mixed with lime and passed directly to a stripping column. Air is introduced through a blower at the bottom of the column to serve as the stripping medium. The ammonia-air mixture is then discharged to the atmosphere at the top of the vessel. Such treatment does not provide for the recovery of ammonia. The device further operates at ambient temperatures and pressures, thus reducing its efficiency. Finally, the device described has not been successfully applied commercially to the treatment of wastewaters because of severe scaling in the column.

SUMMARY OF THE INVENTION

The above and other disadvantages of the prior art methods of treating wastewater and recovering ammonia are overcome by the method of my invention. In the practice of my invention, digester supernatant and/or liquors from sludge dewatering or any combination of the above are combined to form a feed to a closed vessel along with an excess of an alkaline reagent having a stronger cation than ammonium, preferably lime. This results in the conversion of the ammonium salts contained in the reactor feed to free ammonia. Ammonia gas, in a first embodiment, and aqueous ammonia, in a second embodiment, is separated from the reaction product and the excess lime along with materials flocculated and precipitated from the reaction product are removed from the reactor. The solubility of the aqueous ammonia is reduced to a minimum by increasing the temperature of either the reaction product, in the first embodiment, or the separated aqueous ammonia in the second embodiment to or near the boiling point at a lowered pressure. This heating step is preferably undertaken using free steam. The liberated ammonia gas may then be recovered directly as ammonia. In an alternative embodiment, the ammonia may be recovered as aqueous ammonia. The ammonia can also be adsorbed in an acid or recovered as an acid salt. In any case, the recovered ammonia is mixed with conventionally dried sludge to increase its nitrogen content from approximately 1-2 percent to as high as 10 percent, thereby producing a saleable, nitrogen enriched fertilizer.

The solids resulting from the separation of the reaction product contain the unreacted lime plus insoluble calcium salts of materials precipitated from the digester supernatant as well as much of the organic material contained in the wastewater prior to its introduction to the process. Such solids are conveyed to conventional vacuum filtration, centrifugation or dewatering processes for use as a dewatering aid.

The output liquids emerging from my process are essentially odor-free and have a relatively low BOD concentration. These may be returned to the wastewater treatment operations without adverse effect on these processes.

In addition to the above described benefits, the removal of nitrogen from the wastewater substantially reduces the cost of treatment in plants practicing nitrogen removal by biological nitrification/denitrification. This cost reduction results both from a reduction in size of denitrification facilities, and of substantial chemical savings in the operation of such processes.

It is therefore an object of the present invention to provide a method for treating domestic wastewaters, such as digester supernatant, to remove the ammonia therefrom and return it to the dried sludge to increase the nitrogen content of the sludge;

It is another object of the invention to reduce or eliminate the odor of the wastewater stream in a wastewater treatment process;

It is still another object of the invention to reduce the organic material contained in the wastewater stream of a wastewater treatment process; and It is a still further object of the invention to reduce scaling in the treatment of wastewater.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is a diagrammatic view of apparatus according to a second embodiment of the invention for practicing the method depicted in FIG. 1.

DETAILED DESCRIPTION OF THE PREFERRED EMBODIMENTS

Figure 1:
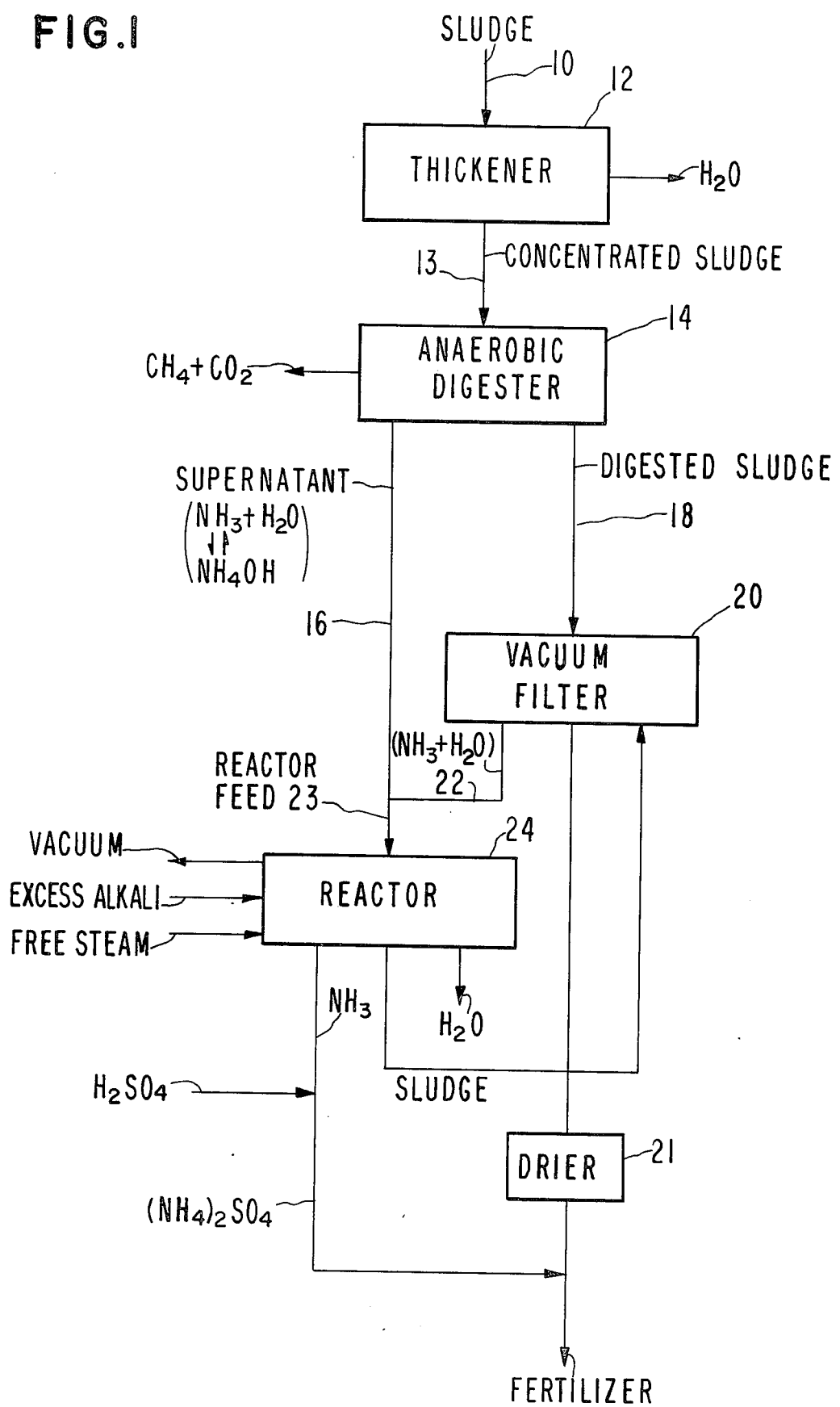
FIG. 1 is a flowchart diagram of the method according to the invention.

Referring now more particularly to FIG. 1, sludge 10 is reduced by any of several known thickening methods 12 to a more concentrated state. The processes most commonly used consist of gravity or flotation thickening. The concentrated sludge 13 is then biologically digested in an anaerobic digester 14 to convert much of the putrescible organic material to carbon dioxide ($CO_2$) and methane ($CH_4$). As mentioned above, during this process much of the nitrogen contained in the sludge is converted to water soluble ammonia. Water in the form of digester supernatant 16 is removed by allowing the sludge to stand quiescent for a period of time in the digester and decanting off the liquid. The digested sludge 18 which remains is then dewatered further by a vacuum filter process 20. The dewatering liquor 22, composed of water and water soluble ammonia removed by the vacuum filter 20, is combined with the supernatant 16 to form a reactor feed 23 and is supplied to a reactor vessel 24. An excess of an alkaline reagent having a stronger cation than ammonium, preferably lime, is introduced into the reactor 24 and is mixed with the reactor feed 23. This mixture results in the conversion of the ammonium salts contained in the reactor feed to either free or aqueous ammonia. The reaction product is separated to remove excess lime along with materials flocculated and precipitated from the liquid in the reaction zone.

To render the aqueous ammonia in the reaction product, in the first embodiment, or as separated from the reaction product, in the second embodiment, less soluble the reactor vessel 24 is operated at a reduced pressure. In the first embodiment the reactor vessel 24 is also heated to an elevated temperature near the boiling point of the reaction product. In the second embodiment the aqueous ammonia separated from the reaction product is heated to a temperature near its boiling point at a reduced pressure. The liberated ammonia gas in either embodiment is then recovered as free ammonia. In other embodiments the ammonia liberated from the reaction product may be recovered as aqueous ammonia. In still other embodiments it may be adsorbed in an acid such as sulfuric acid to form an acid salt such as ammonium sulfate $(NH_4)_2SO_4$ which is ultimately combined with the sludge from the vacuum filter 20 after it has been dried in a drier 21 to produce a nitrogen rich fertilizer.

Figure 2:
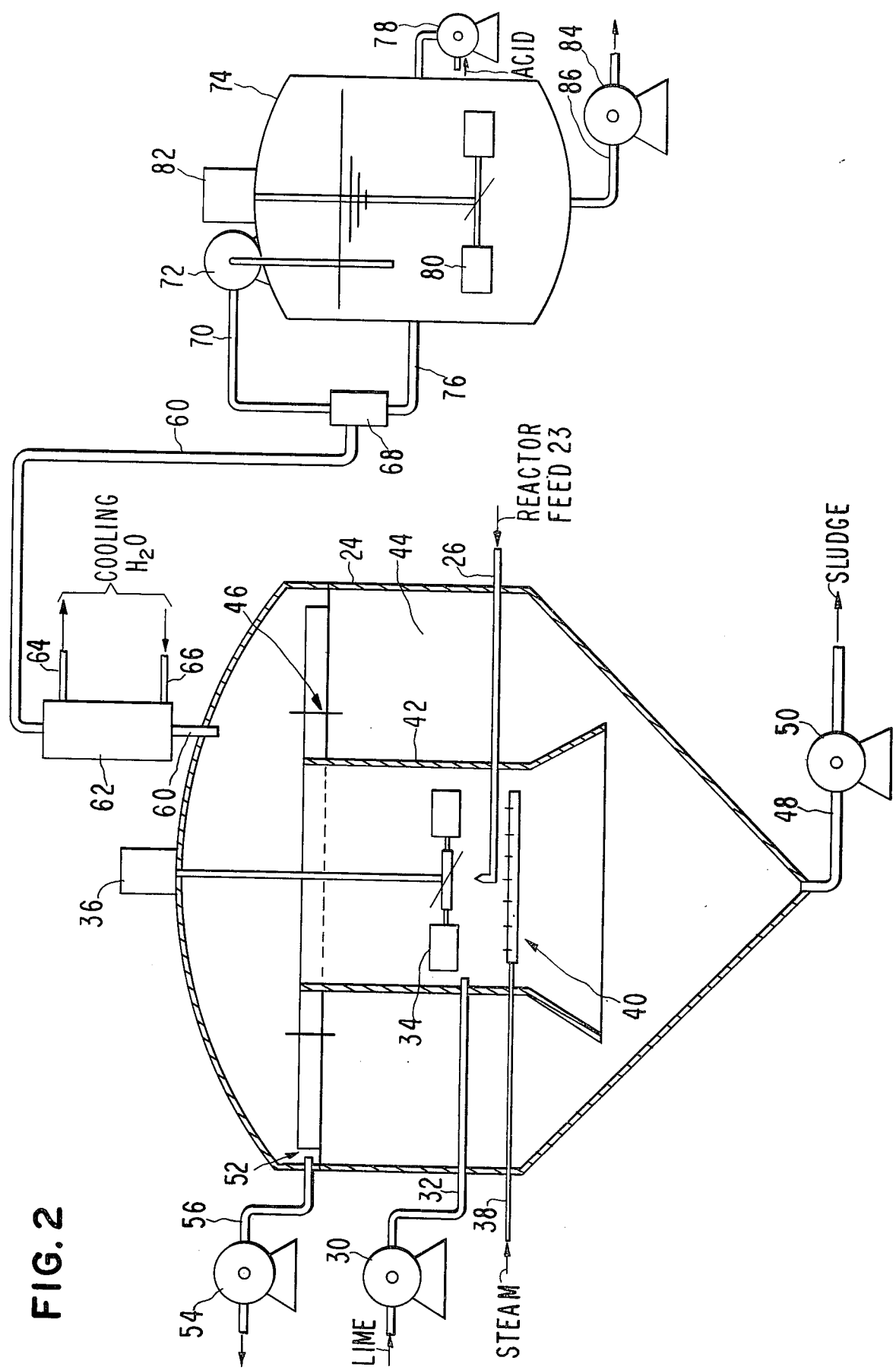
FIG. 2 is a diagrammatic illustration of apparatus according to a first embodiment of the invention for practicing the method depicted in FIG. 1.

Referring now more particularly to FIG. 2, the ammonia recovery steps of my method will be explained in greater detail. The reactor feed 23 is introduced through a line 26 into the reaction zone 28 of the treatment vessel or reactor 24. A stoichiometric excess of an alkaline reagent having a stronger cation than ammonium, such as lime, is also introduced into the reaction zone 28 by means of a pump 30 connected through a pipe 32 to the interior of the reaction zone 28. An agitator 34 within the reaction zone is driven by an external motor 36 to provide sufficient mechanical energy to intimately mix the incoming lime and the reactor feed 23. The agitator 34 further serves to impart an upward velocity, as viewed in FIG. 2, to the liquid in the reaction zone. Steam is introduced directly into the reaction zone by means of a line 38 which passes through the wall of the reactor 24 and is connected to a diffuser 40 within the reaction zone. The steam serves both to heat the liquid and to provide additional agitation and upward movement to the liquid contained in the reaction zone as defined by a bell shaped baffle 42. The purpose of using free steam rather than steam coil heating pipes is to prevent scaling, a serious problem in the operation of conventional sludge treatment plants. In some conventional treatment plants scale forming on a heat exchanger surface within the reactor reduces the heat transfer efficiency of the exchanger, eventually requiring that the system be shut down and cleaned. Such shutdowns are expensive and troublesome.

The heated reaction product then overflows the top of the baffle 42 and is thereby introduced into a clarification zone 44 of the reactor. A further baffle 46 which is generally concentric with the bell shaped baffle 42 serves to confine the turbulence created in the reaction zone and to distribute the reaction product equally around the clarification zone 44. In the clarification zone, a downward velocity is imparted to the reaction product by the flow into the bottom of the reaction zone defined by the bottom opening of the baffle 42. Further, the turbulence is so reduced that the contained solids are separated from the reaction product and settle out into the cone-shaped bottom of the reactor 24 and are removed by a pump 48 connected to the bottom of the reactor 24 through a pipe 50. As the reactor feed 23 is introduced into the reactor 24, an equal volume of the effluent from the clarification zone overflows a weir 52 at the top of the baffle 42 and is removed from the vessel by a pump 54 connected to the top of the vessel by a line 56 at the point of the weir 52.

The liquid circulation pattern induced in the reactor 24 by the agitator 34 results in the reaction product passing through both the reaction and clarification zones a number of times so that the removal of ammonia is greatly enhanced. The precise residence time of the reaction product in the tank is, of course, a function both of the rate of introduction of the reactor feed and the volume of the reactor. Both of these values are adjustable for particular installations to achieve the desired degree of removal.

The vapors separated from the reaction product, which consist primarily of water and ammonia, are removed from the reactor vessel 24 through a line 60 at the top of the vessel. A condenser 62 in the line 60 is used to cool the vapors sufficiently to cause most of the water to condense and flow back to the reactor vessel 24. The condenser 62 is of a conventional design and may be cooled by circulation of water entering through a line 64 and exiting through a line 66 of the condenser 62. The condenser 62, of course, may also be a more elaborate device.

The cooled vapors, now consisting primarily of ammonia gas, are next introduced through the line 60 to a vacuum aspirator 68 which has its output connected through a line 70 to a water-removing pump 72 mounted on the top of a crystallizer 74. The output of the pump 72 discharges below the water line in the interior of the crystallizer 74. The vacuum aspirator 68 has a second input line 76 which draws liquid from the crystallizer 74. The pump 72 removes liquid from the crystallizer 74 and circulates it through the vacuum aspirator back to the crystallizer vessel by means of the lines 70 and 76. Such an arrangement serves both to contact the ammonia gas with the liquid contained in the crystallizer, resulting in its dissolution and to create a vacuum on the reactor vessel 24 so that the pressure above the reaction zone is substantially reduced below atmospheric pressure. This is an important feature of the invention in that many prior art references teach exactly the opposite, such as, for example, U.S. Pat. No. 1,838,587.

The desired range of vacuum depends somewhat on the temperature of the reaction product 23. The object of reducing the pressure within the reactor 24 and elevating the temperature of the reaction product is to cause the ammonia gas in the solution to become insoluble. In general a preferred vacuum range would be 10-28 inches of mercury when the temperature in the reactor is at or near the boiling point of the solution. In other embodiments vacuum on the reactor may be generated and the vapors transported by a conventional vacuum pump connected between the reactor and the crystallizer with the outlet of the vacuum pump discharging below the liquid surface of the crystallizer.

In the crystallizer 74 acid is added to the aqueous ammonia by means of a pump 78 at a rate sufficient to maintain the pH in the crystallizer at that value which yields the minimum solubility of the salt formed with the particular acid used. Examples of suitable acids are sulfuric and phosphoric acids. As ammonia is added to the crystallizer 74, the concentration of the ammonium salt formed increases to the saturation point. When this occurs, crystallization of the ammonium salt begins. An agitator 80 within the crystallizer 74 and below the liquid surface is rotated by a motor 82 which is mounted externally of the crystallizer 74. The operation of the agitator 80 serves to suspend the crystals for a period of time, thereby promoting their growth. When the crystals reach a certain size, depending upon the specific design of the crystallizer, they settle to the bottom of the crystallizer vessel and are removed as a water slurry by means of a pump 84 connected to the bottom of the crystallizer vessel 74 through a line 86. As described above, these ammonium salt crystals, either in slurry form or after drying, are preferably added to the dried sludge to create a nitrogen-rich fertilizer.

Referring now more particularly to FIG. 3, a second method for recovering the ammonia according to the invention will now be described. The reactor feed 23 is introduced through a line 100 and lime or other alkaline reagent having a stronger cation than ammonium is introduced to a stoichiometric excess through a line 102 into the reactor vessel 24'. The reactor feed 23 and the lime are actually introduced into a reaction zone 106 of the reactor 24' as defined by a baffle 108. An agitator 110 within the baffle 108 is driven by an external motor 112 to promote intimate mixing between the lime added through the line 102 and the reactor feed 23 supplied through line 100. The agitator 110 further serves to impart an upward velocity within the contact zone. In contrast to the embodiment described in reference to FIG. 2, no steam is added to the reactor 24' and the volume of the reaction zone 106 is substantially smaller than in the reaction zone 28 of the embodiment depicted in FIG. 2. The reaction product overflowing the top of the reaction zone baffle 108 enters a clarification zone 114 where the solids separate, settle out and are removed through a line 116 attached between the bottom of the reactor 24' and a pump 118.

The clarified effluent eventually overflows a weir 120 and discharges into a tank 122 which is constructed as an integral part of the reactor 24' on its side in the embodiment shown in FIG. 3. A vacuum line 124 connects the tank 122 with the top of a stripping column 126. The clarified effluent within the tank 122 flows through the line 124 to the top of the stripping column 126 where it is distributed over an inert packing material 128, such as plastic grids contained within the stripping column, and then flows by gravity downward through the packing material 128.

Steam is introduced at the bottom of the stripping column 126 through a line 130 and passes in countercurrent fashion to the flow of liquid through the packing material 128. This steam serves to increase the temperature of the clarified effluent to near its boiling point and to strip the ammonia gas from it.

A subatmospheric pressure is maintained in the tower by an aspirator or vacuum pump (not shown), similar to that shown in FIG. 2, which is connected to the stripping column by a line 132. As in the embodiment discussed in reference to FIG. 2, the range of pressure should be sufficient to decrease the solubility of the ammonia. A preferred pressure range would be 10–28 inches of mercury. The ammonia and residual steam also exit from the stripping column 126 through the line 132 connected to the vacuum system. The water contained in the vapors may then be condensed as described above for return to the reactor 24' while the ammonia is recovered as ammonia gas. Alternatively, condensation of the water vapor may be allowed to occur in such a fashion that the ammonia gas redissolves in the condensate, thereby allowing the recovery of aqueous ammonia.

Treated discharge from the stripping column 126 exits from its bottom through a line 134. Depending upon the contact time in the reactor 24' and the packed stripping column 126, this treated discharge may be fed to the remaining wastewater treatment system or a portion may be returned to the reactor 24' for further treatment to obtain more ammonia.

In both of the embodiments described above, the clarified effluent is heated by the introduction of steam and the pressure is reduced below atmospheric pressure by a vacuum pump or aspirator. In less advantageous embodiments, the reaction vessel or packed column may be heated by indirect means, such as by a conventional heat exchanger to produce steam directly from the reaction product or the clarified effluent, respectively. In such embodiments, it may be desirable to produce the required vacuum by condensing at least a portion of the steam in the stripping column 126 or in an external condenser.

In both of the embodiments described above, several advantages over the prior art accrue. The first advantage is that carbonate salts, which would precipitate out of solutions and form scale in a conventional stripping column, are removed by clarification of the reaction product. Such removal prevents the loss of stripping or heat exchange capabilities by deposition of the scale on other surfaces. Secondly, the method of the invention results in the precipitation of much of the sulfides contained in the reactor feed as insoluble calcium sulfides. This, in turn, results both in the reduction of the BOD of the treated wastewater and also in their deodorization. Sulfides, not so removed, which are removed with the solids from the bottom of the reactor are still in the nonvolatile salt form and therefore do not contribute significantly to odor.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A method of treating waste water in a sewage treatment plant to remove ammonia comprising the sequential steps of:
   A. reducing said waste water to sludge;
   B. placing said sludge in an anaerobic digester;
      (1) converting a substantial quantity of the putrescible organic material found in said sludge to methane and carbon dioxide, and,
      (2) converting a substantial quantity of nitrogen found in said sludge to ammonia;
   C. removing the digester supernatant;
   D. dewatering said digested sludge to separate from the sludge, dewatering liquor being substantially composed of water and water soluble ammonia;
   E. combining said supernatant with said dewatering liquor;
   F. reacting with said supernatant and dewatering liquor, to form a reaction product, a stoichiometric excess of lime thus converting ammonia salts found in the supernatant and dewatering liquor to free or aqueous ammonia;
   G. rendering the ammonia less soluble in the reaction product by applying to said product, live steam under reduced pressure.

2. The method of treating waste water as recited in claim 1 further comprising the steps of
   A. drying the sludge;
   B. reacting the ammonia recovered from the waste water with acid to form an ammonium salt; and
   C. mixing the ammonium salt with the dried sludge to form a nitrogen enriched fertilizer.

* * * * *